US008163048B2

(12) United States Patent
Rappas et al.

(10) Patent No.: US 8,163,048 B2
(45) Date of Patent: Apr. 24, 2012

(54) CATALYST-LOADED COAL COMPOSITIONS, METHODS OF MAKING AND USE

(75) Inventors: Alkis S. Rappas, Kingwood, TX (US); George Frederick Salem, Aurora, IL (US); Edwin J. Hippo, Round Lake, IL (US)

(73) Assignee: Greatpoint Energy, Inc., Cambridge, MA (US)

( * ) Notice: Subject to any disclaimer, the term of this patent is extended or adjusted under 35 U.S.C. 154(b) by 508 days.

(21) Appl. No.: 12/178,380

(22) Filed: Jul. 23, 2008

(65) Prior Publication Data
US 2009/0048476 A1 Feb. 19, 2009

Related U.S. Application Data

(60) Provisional application No. 61/066,130, filed on Aug. 2, 2007.

(51) Int. Cl.
*B01J 23/04* (2006.01)
*C07C 4/00* (2006.01)

(52) U.S. Cl. ........................................... 48/210

(58) Field of Classification Search ............... 48/127.1, 48/187 R–197 A, 210; 502/100–355; 585/700–752, 585/943
See application file for complete search history.

(56) References Cited

U.S. PATENT DOCUMENTS

| 2,813,126 A | 11/1957 | Tierney |
| 2,886,405 A | 5/1959 | Benson et al. |
| 3,114,930 A | 12/1963 | Oldham et al. |
| 3,435,590 A | 4/1969 | Smith |
| 3,594,985 A | 6/1969 | Ameen et al. |
| 3,531,917 A | 10/1970 | Grunewald et al. |
| 3,615,300 A | 10/1971 | Holm et al. |
| 3,689,240 A | 9/1972 | Aldridge et al. |
| 3,740,193 A | 6/1973 | Aldridge et al. |
| 3,759,036 A | 9/1973 | White |
| 3,779,725 A | 12/1973 | Hegarty et al. |
| 3,828,474 A | 8/1974 | Quartulli |
| 3,847,567 A | 11/1974 | Kalina et al. |
| 3,904,386 A | 9/1975 | Graboski et al. |
| 3,915,670 A | 10/1975 | Lacey et al. |
| 3,920,229 A | 11/1975 | Piggott |

(Continued)

FOREIGN PATENT DOCUMENTS

CA 966660 4/1975

(Continued)

OTHER PUBLICATIONS

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

(Continued)

*Primary Examiner* — Imran Akram
(74) *Attorney, Agent, or Firm* — McDonnell Boehnen Hulbert & Berghoff LLP

(57) ABSTRACT

The present invention relates to catalyst-loaded coal compositions having a moisture content of less than about 6 wt %, a process for the preparation of catalyst-loaded coal compositions, and an integrated process for the gasification of the catalyst-loaded coal compositions. The catalyst-loaded coal compositions can be prepared by a diffusive catalyst loading process that provides for a highly dispersed catalyst that is predominantly associated with the coal matrix, such as by ion-exchange.

20 Claims, 3 Drawing Sheets

U.S. PATENT DOCUMENTS

| | | |
|---|---|---|
| 3,929,431 A | 12/1975 | Koh et al. |
| 3,958,957 A | 5/1976 | Koh et al. |
| 3,969,089 A | 7/1976 | Moss et al. |
| 3,975,168 A | 8/1976 | Gorbaty |
| 3,985,519 A | 10/1976 | Kalina et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,021,370 A | 5/1977 | Harris et al. |
| 4,046,523 A | 9/1977 | Kalina et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,235,044 A | 11/1980 | Cheung |
| 4,243,639 A | 1/1981 | Haas et al. |
| 4,260,421 A | 4/1981 | Brown et al. |
| 4,265,868 A | 5/1981 | Kamody |
| 4,284,416 A | 8/1981 | Nahas |
| 4,292,048 A | 9/1981 | Wesselhoft et al. |
| 4,315,758 A | 2/1982 | Patel et al. |
| 4,318,712 A | 3/1982 | Lang et al. |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,347,063 A | 8/1982 | Sherwood et al. |
| 4,348,486 A | 9/1982 | Calvin et al. |
| 4,348,487 A | 9/1982 | Calvin et al. |
| 4,353,713 A | 10/1982 | Cheng |
| 4,365,975 A | 12/1982 | Williams et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,432,773 A | 2/1984 | Euker, Jr. et al. |
| 4,433,065 A | 2/1984 | Van der Burgt et al. |
| 4,436,531 A | 3/1984 | Estabrook et al. |
| 4,439,210 A | 3/1984 | Lancet |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,500,323 A | 2/1985 | Siegfried et al. |
| 4,508,544 A | 4/1985 | Moss |
| 4,515,604 A | 5/1985 | Eisenlohr et al. |
| 4,515,764 A | 5/1985 | Diaz |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,597,775 A | 7/1986 | Billimoria et al. |
| 4,597,776 A | 7/1986 | Ullman et al. |
| 4,604,105 A | 8/1986 | Aquino et al. |
| 4,609,456 A | 9/1986 | Deschamps et al. |
| 4,617,027 A | 10/1986 | Lang |
| 4,619,864 A | 10/1986 | Hendrix et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,822,935 A | 4/1989 | Scott |
| 4,848,983 A | 7/1989 | Tomita et al. |
| 4,854,944 A | 8/1989 | Strong |
| 4,861,360 A | 8/1989 | Apffel |
| 4,876,080 A | 10/1989 | Paulson |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,720,785 A | 2/1998 | Baker |
| 5,733,515 A | 3/1998 | Doughty et al. |
| 5,776,212 A | 7/1998 | Leas |
| 5,855,631 A | 1/1999 | Leas |
| 5,865,898 A | 2/1999 | Holtzapple et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,132,478 A * | 10/2000 | Tsurui et al. .................. 44/280 |
| 6,180,843 B1 | 1/2001 | Heinemann et al. |
| 6,187,465 B1 | 2/2001 | Galloway |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,855,852 B1 | 2/2005 | Jackson et al. |
| 6,894,183 B2 | 5/2005 | Choudhary et al. |
| 6,955,695 B2 | 10/2005 | Nahas |
| 7,074,373 B1 | 7/2006 | Warren et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2006/0265953 A1 | 11/2006 | Hobbs |
| 2007/0000177 A1 | 1/2007 | Hippo et al. |
| 2007/0051043 A1 | 3/2007 | Schingnitz et al. |
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0277437 A1 | 12/2007 | Sheth |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |

| | | | |
|---|---|---|---|
| 2009/0165379 A1 | 7/2009 | Rappas | |
| 2009/0165380 A1 | 7/2009 | Lau et al. | |
| 2009/0165381 A1 | 7/2009 | Robinson | |
| 2009/0165382 A1 | 7/2009 | Rappas et al. | |
| 2009/0165383 A1 | 7/2009 | Rappas et al. | |
| 2009/0165384 A1 | 7/2009 | Lau et al. | |
| 2009/0166588 A1 | 7/2009 | Spitz et al. | |
| 2009/0169448 A1 | 7/2009 | Rappas et al. | |
| 2009/0169449 A1 | 7/2009 | Rappas et al. | |
| 2009/0170968 A1 | 7/2009 | Nahas et al. | |
| 2009/0217575 A1 | 9/2009 | Raman et al. | |
| 2009/0217582 A1 | 9/2009 | May et al. | |
| 2009/0217584 A1 | 9/2009 | Raman et al. | |
| 2009/0217585 A1 | 9/2009 | Raman et al. | |
| 2009/0217586 A1 | 9/2009 | Rappas et al. | |
| 2009/0217587 A1 | 9/2009 | Raman et al. | |
| 2009/0217588 A1 | 9/2009 | Hippo et al. | |
| 2009/0217589 A1 | 9/2009 | Robinson | |
| 2009/0217590 A1 | 9/2009 | Rappas et al. | |
| 2009/0218424 A1 | 9/2009 | Hauserman | |
| 2009/0220406 A1 | 9/2009 | Rahman | |
| 2009/0229182 A1 | 9/2009 | Raman et al. | |
| 2009/0246120 A1 | 10/2009 | Raman et al. | |
| 2009/0259080 A1 | 10/2009 | Raman et al. | |
| 2009/0260287 A1 | 10/2009 | Lau | |
| 2009/0324458 A1 | 12/2009 | Robinson et al. | |
| 2009/0324459 A1 | 12/2009 | Robinson et al. | |
| 2009/0324460 A1 | 12/2009 | Robinson et al. | |
| 2009/0324461 A1 | 12/2009 | Robinson et al. | |
| 2009/0324462 A1 | 12/2009 | Robinson et al. | |
| 2010/0071262 A1 | 3/2010 | Robinson et al. | |
| 2010/0076235 A1 | 3/2010 | Reiling et al. | |
| 2010/0120926 A1 | 5/2010 | Robinson et al. | |
| 2010/0121125 A1 | 5/2010 | Hippo et al. | |
| 2010/0168494 A1 | 7/2010 | Rappas et al. | |
| 2010/0168495 A1 | 7/2010 | Rappas et al. | |
| 2010/0179232 A1 | 7/2010 | Robinson et al. | |

FOREIGN PATENT DOCUMENTS

| | | |
|---|---|---|
| CA | 1003217 | 1/1977 |
| CA | 1106178 | 8/1981 |
| CA | 1187702 | 6/1985 |
| CN | 1477090 | 2/2004 |
| DE | 2210891 | 9/1972 |
| DE | 2852710 | 6/1980 |
| DE | 3422202 | 12/1985 |
| DE | 100610607 | 6/2002 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0 723 930 | 7/1996 |
| EP | 819 | 4/2000 |
| EP | 1 001 002 | 5/2000 |
| EP | 1 741 673 | 6/2006 |
| FR | 797 089 | 4/1936 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 2078251 | 1/1982 |
| GB | 2154600 | 9/1985 |
| JP | 54020003 | 2/1979 |
| JP | 56157493 | 12/1981 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| WO | WO 00/43468 | 7/2000 |
| WO | WO 02/40768 | 5/2002 |
| WO | WO 02/079355 | 10/2002 |
| WO | WO 03/033624 | 4/2003 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | WO 2007/076363 | 7/2007 |
| WO | WO 2007/128370 | 11/2007 |
| WO | WO 2007/143376 | 12/2007 |
| WO | WO 2008/073889 | 6/2008 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |

OTHER PUBLICATIONS

Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From A Thermally Ballasted Gasifier," Aug. 2005.

Brown et al., "Biomass-Derived Hydrogen From A Thermally Ballasted Gasifier," DOE Hydrogen Program Contractors' Review Metting, Center for Sustainable Environmental Technologies, Iowa State University, May 21, 2003.

Coal Conversion Processes (Gasification), Encyclopedia of Chemical Technology, 4$^{th}$ Edition, vol. 6, pp. 541-566.

Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.

Nahas, N.C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

"Integrate Gasification Combined Cycle (IGCC)," WorleyParsons Resources & Energy, http://www.worleyparsons.com/v5/page.aspx?id=164.

U.S. Appl. No. 12/778,538, filed May 12, 2010, Robinson et al.
U.S. Appl. No. 12/778,548, filed May 12, 2010, Robinson et al.
U.S. Appl. No. 12/778,552, filed May 12, 2010, Robinson et al.

Adsorption, http://en.wikipedia.org/wiki/Adsorption, pp. 1-8.
Amine gas treating, http://en.wikipedia.org/wiki/Acid_gas_removal pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", Energy Sources, vol. 25, pp. 679-687, (2003).
Fluidized Bed Gasifiers, http://www.energyproducts.com/fluidized_bed_gasifiers.htm, pp. 1-5.
Gas separation, http://en.wikipedia.org/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", Energy Research, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and C1 by leaching of straw char', Biomass and Bioenergy, vol. 20, pp. 447-457, (2001).
Mengjie, et al., "A potential renewable energy resource development and utilization of biomass energy", http://www.fao.org.docrep/T4470E/t4470e0n.htm, pp. 1-8.
Meyers, et al. Fly Ash as A Construction Material for Highways, A Manual. Federal Highway Administration, Report No. FHWA-IP-76-16, Washington, DC, 1976.
Moulton, Lyle K. "Bottom Ash and Boiler Slag", Proceedings of the Third International Ash Utilization Symposium, U.S. Bureau of Mines, Information Circular No. 8640, Washington, DC, 1973.
Natural gas processing, http://en.wikipedia.org/wiki/Natural_gas_processing, pp. 1-4.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", Fuel Processing Technology, vol. 86, pp. 375-389, (2004).
Reboiler, http://en.wikipedia.org/wiki/Reboiler, pp. 1-4.
What is XPS?, http://www.nuance.northwestern.edu/KeckII/xps1.asp, pp. 1-2.
2.3 Types of gasifiers, http://www.fao.org/docrep/t0512e/T0512e0a.htm pp. 1-6.
2.4 Gasification fuels, http://www.fao.org/docrep/t0512e/T0512e0b.htm#TopofPage, pp. 1-8.
2.5 Design of downdraught gasifiers, http://www.fao.org/docrep/t0512e/T0512e0c.htm#TopOfPage, pp. 1-8.
2.6 Gas cleaning and cooling, http://www.fao.org/docrep/t0512e0d.htm#TopOFPage, pp. 1-3.

\* cited by examiner

MBU: MINI BENCH UNIT FOR TESTING CATALYZED COMPOSITIONS

US 8,163,048 B2

CATALYST-LOADED COAL COMPOSITIONS, METHODS OF MAKING AND USE

CROSS-REFERENCE TO RELATED APPLICATION

This application claims priority under 35 U.S.C. §119 from U.S. Provisional Application Ser. No. 61/066,130 (filed Aug. 2, 2007), the disclosure of which is incorporated by reference herein for all purposes as if fully set forth.

FIELD OF THE INVENTION

The present invention relates to integrated processes for making methane from coal. The present invention further relates to processes wherein catalyst is loaded onto coal. The invention further relates to improved catalyst-loaded coal compositions.

BACKGROUND DESCRIPTION OF RELATED ART

The production of gases from coal is receiving renewed attention in the present environment of high energy prices. Of particular interest is the catalytically enhanced gasification of coal with steam in a fluidized bed reactor. Such processes have the potential of being energy efficient and requiring lower investment costs.

The gasification of coal is typically achieved by reacting steam and coal at a very high temperature, or at moderate temperatures in the presence of alkali metal catalysts. Early work focused on the use of Group I and II metals loaded on coal particles as catalysts. However, these processes experienced shortcomings in catalyst-loading on coal and catalyst recovery and recycle from the gasifier discharged char. U.S. Pat. No. 3,828,474 describes the production of methane from hydrocarbons using a catalyst such as supported nickel catalyst promoted with alkali metal. U.S. Pat. No. 3,958,957 discloses a method of producing methane from coal using potassium as a gasification catalyst. U.S. Pat. No. 4,092,125 discloses a hydrothermal method for incorporating catalyst on coal. U.S. Pat. No. 3,998,607 and U.S. Pat. No. 4,057,512 disclose methods of alkali metal recovery. U.S. Pat. No. 4,094,650 discloses producing methane and carbon dioxide from carbonaceous feed material in the presence of a carbon-alkali metal catalyst and added hydrogen and carbon monoxide. U.S. Pat. No. 4,204,843 discloses a method wherein both alkali metal and alkaline earth metal catalysts are used. U.S. Pat. No. 4,468,231 discloses a method wherein alkali metal and alkaline earth metal cations are ion-exchanged in the presence of an oxidizing gas. GB 1599932 discloses a loading method that employs air oxidation of coal to increase oxygen content and treats coal with alkaline solution of hydroxides of potassium or sodium or alkaline earth metals.

While it has been suggested to improve the gasification of coal by admixing coal with a selected catalyst, or catalysts, techniques heretofore suggested have not been entirely successful. For example, known methods of impregnating coal with catalyst include: a) physical admixing of catalyst with coal, and b) incipient wetness ("IW") impregnation, wherein a catalyst-containing solution is added to a dry coal, and the volume of the solution is not in excess, but is instead just enough to completely fill the pores of the coal. These methods of coal impregnation suffer the drawback of producing a coal with catalyst loading that is not highly dispersed, and thus a coal with reduced gasification efficiency. The art has placed little emphasis on catalyst-loaded coal with highly dispersed catalyst loading, and processes to prepare same. Accordingly, it is an object of the present invention to provide improved processes for the production of methane from coal. It is also an object of the present invention to provide improved processes for loading catalyst onto coal so as to provide coal compositions particularly adapted for the gasification of coal to methane.

SUMMARY OF THE INVENTION

The present invention is directed to catalyst-loaded coal compositions that result in an efficient, high-yielding gasification to methane, particularly when used in a steady-state integrated gasification process. The catalyst-loaded coal compositions of the present invention have catalyst highly dispersed throughout the coal matrix, and high gasification activity at lower catalyst loading. The catalyst-loaded coal compositions of the present invention are particularly useful for gasification at moderate temperatures ranging from about 450° C. to about 750° C. One aspect of the present invention is a process to produce the highly dispersed catalyst-loaded coal compositions via a process comprising loading catalyst by, e.g., diffusion and ion-exchange. Such processes are readily integrated with catalyst recovery processes, whereby the recovered catalyst can be recycled in the form of a relatively dilute solution. Another aspect of the present invention is to provide a method of producing catalyst-loaded coal compositions having a high degree of predictability and reproducibility with respect to amount of catalyst loading and the degree of dispersion of the catalyst. Yet another aspect of the present invention is to provide a catalyst-loaded coal composition and process for preparing same that can be readily incorporated into coal-to-methane gasification processes and that can result in a more cost-effective, higher-yielding production of methane gas than previously known.

Catalyst-loaded coal composition according to the present invention generally comprise a coal and a gasification catalyst, wherein (i) the coal comprises a matrix containing ion exchange sites comprising acidic functional groups; (ii) the composition has a moisture content of less than about 6 wt %; (iii) the gasification catalyst is an alkali metal cation or mixtures thereof, (iv) the gasification catalyst is present in an amount such that a ratio of catalyst atoms to carbon atoms is in the range of about 0.01 to about 0.1; and (v) greater than about 50% of the total amount of the catalyst loaded is associated with the coal matrix by ion exchange on the acidic functional groups of the coal. The catalyst should be highly dispersed throughout the coal matrix.

Catalyst-loaded coal compositions of the present invention can be prepared by a diffusive catalyst loading ("DCL") process comprising the steps of: (a) grinding a coal, (b) soaking the ground coal in an excess amount of catalyst-containing solution at contact times and temperatures so as to provide ample opportunity to achieve substantial and uniform catalyst loading, (c) dewatering the soaked catalyst-loaded coal, and (d) drying the dewatered catalyst-loaded coal by thermal treatment under a dry inert gas flow.

DETAILED DESCRIPTION

Figure 1:
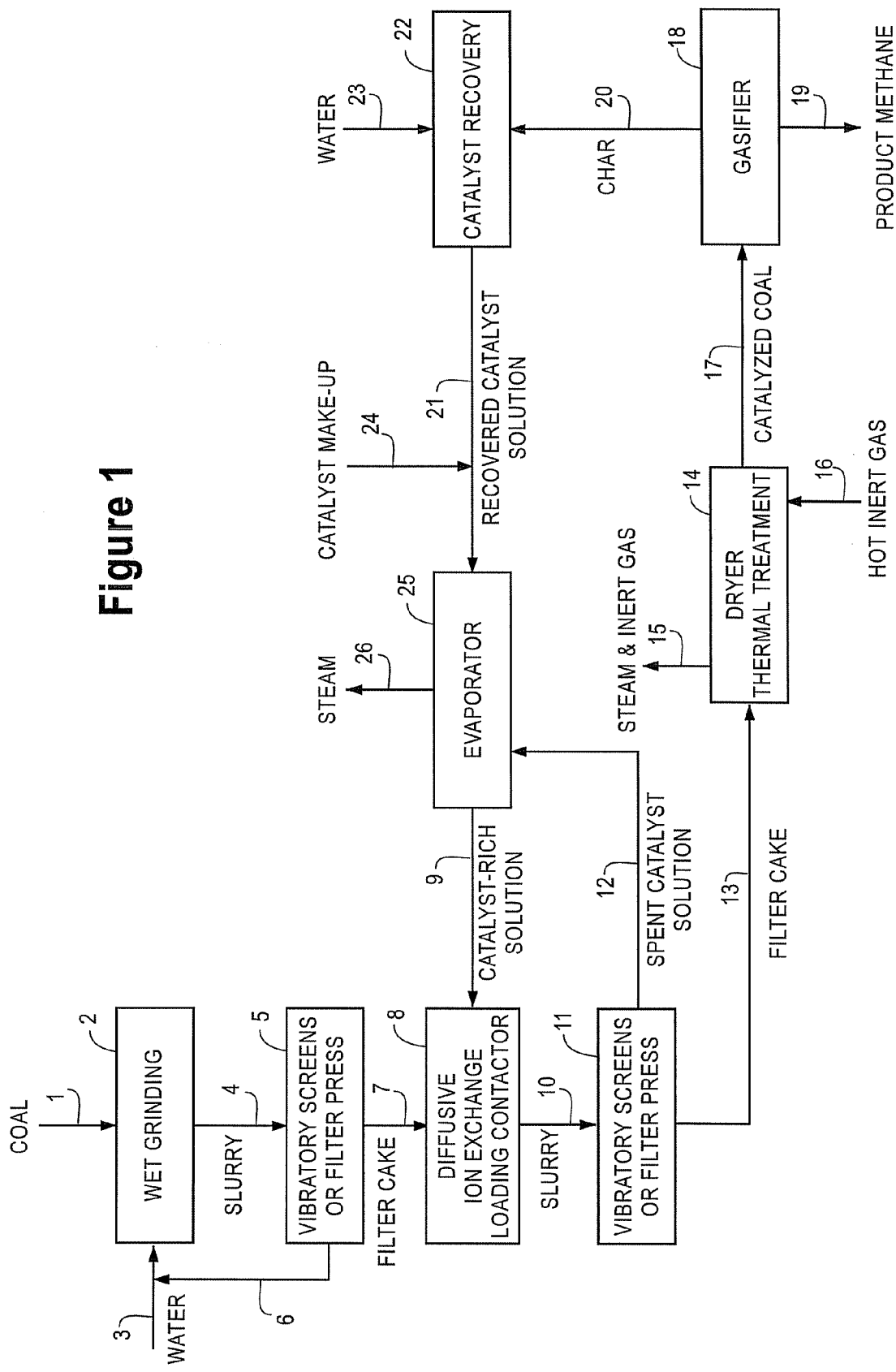
FIG. 1 shows a schematic of an integrated process for the preparation of catalyst-loaded coal compositions of the present invention and for the production of methane.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The materials, methods, and examples herein are illustrative only and, except as specifically stated, are not intended to be limiting.

The catalyst-loaded coal compositions of the present invention are particularly useful for an integrated process for the production of methane from coal, and result in an advantageously higher percent carbon conversion at lower catalyst loading than achieved with previously known coal compositions, such as those prepared by the IW method. Furthermore, the catalyst-loaded coal compositions of the present invention, when used in an integrated gasification process, maximize carbon conversion while minimizing the total catalyst.

The term "coal" as used herein refers to any carbonaceous material including, but not limited to, sub-bituminous, bituminous, lignite, anthracite or mixtures thereof. Coals that contain a large number of ion-exchange sites are particularly suitable as the coal in the present invention. In preferred embodiments, sub-bituminous and lignite coals are used. Sub-bituminous coal is particularly preferred. Carbonaceous materials that are deficient in ion-exchange sites (e.g., petroleum cokes) are also contemplated for use as catalyst-loaded coal compositions in the present invention. In one embodiment, feedstocks that are deficient in ion-exchange sites are pre-treated to create additional ion-exchange sites. In this embodiment, pre-treatment can be accomplished by any method known to the art that creates ion-exchange capable sites and enhances the porosity of the carbonaceous feed, e.g., the methods described in U.S. Pat. No. 4,468,231 and GB1599932. In a preferred embodiment, pre-treatment is accomplished in an oxidative manner using any oxidant known to the art. In one embodiment, petroleum coke is the carbonaceous material that is deficient in ion-exchange sites, and is pretreated for use in accordance with the present invention.

The catalyst-loaded coal compositions of the present invention, unlike previously known coal compositions, are particularly useful for gasification at moderate temperatures ranging from about 450° C. to about 750° C., preferably from about 600° C. to about 700° C. The catalyst-loaded coal compositions are particularly useful for gasification at pressures ranging from about 50 psig to about 1000 psig, preferably from about 200 psig to about 700 psig, and more preferably from about 400 psig to about 600 psig.

The catalysts of the catalyst-loaded coal compositions include catalysts that enhance coal gasification activity at moderate temperatures when used in a steady-state integrated gasification process. The catalysts are metal cations. Preferred catalysts include Group I alkali metal cationic catalysts. Particularly preferred catalysts include potassium, sodium, lithium or mixtures thereof. More particularly preferred catalysts are potassium and sodium. The most particularly preferred catalyst is potassium. The source of the catalysts is catalyst salts. Preferred catalyst salts include carbonate, hydroxide, sulfate, chloride and nitrate salts. Particularly preferred catalyst salts are carbonate and hydroxide salts.

In the catalyst-loaded coal compositions, preferably greater than about 50%, more preferably greater than about 70%, even more preferably greater than about 85%, and most preferably greater than about 90% of the total amount of catalyst loaded is associated with the coal matrix, for instance as ion-exchanged catalyst on the acidic functional groups of the coal. The percentage of total loaded catalyst that is associated with the coal matrix, such as by ion-exchange, can be determined by determining the percentage of catalyst loaded that can not be accounted for by association with its salt counterion, i.e., in stoichiometric excess of the counterion. The total amount of catalyst within a catalyst-loaded coal composition can be determined by Inductively Coupled Plasma-Atomic Emission Spectroscopy ("ICP-AES"). ICP-AES uses a plasma to generate excited atoms that emit electromagnetic radiation at a wavelength characteristic of a particular element. The intensity of the emission is a function of the concentration of the element within the sample. In embodiments where the salt counterion is carbonate, the total amount of carbonate within the coal sample can be determined by both powder X-ray diffraction ("XRD") and/or Fourier-Transform Infrared (FT-IR) spectroscopy. XRD is based upon the elastic scattering of X-rays against a sample, and can be used both to identify crystalline substances (by diffraction peaks) and to determine the abundance of the crystalline substances. Anhydrous potassium carbonate exhibits characteristic intense reflections at $2\theta=31.635°$ and $2\theta=32.090°$. FT-IR spectroscopy can be used to quantify carbonate in a sample. Carbonate exhibits characteristic peaks in the FT-IR spectrum centered around 1356 cm$^{-1}$, 879 cm$^{-1}$, and 704 cm$^{-1}$. The intensity of a peak is a function of the concentration of carbonate in the sample. Given the total amount of catalyst (e.g., as determined by ICP-AES), and the total amount of carbonate (e.g., as determined by XRD and/or FT-IR), the amount of catalyst that is in stoichiometric excess of carbonate can be determined. The percentage of catalyst in excess of the carbonate thus determined is the minimum percentage of catalyst that is associated with the coal matrix, for instance as ion-exchanged catalyst on the acidic functional groups of the coal. It is believed that the actual percentage will be higher due to carbonate being associated with other elements within the coal sample (i.e., calcium). An analogous procedure may be followed for other counterions.

The catalyst-loaded coal compositions of the invention comprise catalyst that is predominantly associated with the coal matrix such as by ion-exchange. It is believed that, because the catalyst is predominantly associated with the coal matrix for example as ion-exchanged species, and because of the increased wetability afforded by the diffusive process, the catalyst is highly dispersed throughout the coal matrix. It is further believed that the higher uniform dispersion and higher degree of ion-exchange of catalyst throughout the coal results in more active catalyst-loaded coal compositions and these compositions are thus a higher-yielding feed when used in an integrated process for making methane from coal.

The portion of the catalyst that is not associated with the coal matrix is instead present as unreacted, "free" catalyst. In embodiments where the metal catalyst is loaded as a carbonate salt, the free catalyst within the catalyst-loaded coal composition is present as carbonate salts, and the catalyst-loaded coal compositions contain little or no measurable amounts of alkali metal bicarbonate, as determined by FT-IR spectroscopy. Bicarbonate exhibits characteristic peaks in the FT-IR spectrum centered around 2620 cm$^{-1}$, 1300 cm$^{-1}$, and 1000 cm$^{-1}$. The FT-IR spectrum of a catalyst-loaded coal composition of the invention does not exhibit peaks due to bicarbonate.

In accordance with the present disclosure, the total amount of catalyst present in the coal is represented as the ratio of catalyst atoms to carbon atoms in the coal ("M/C"). The M/C ratio for the catalyst-loaded coal compositions of the invention ranges from about 0.01 to about 0.1, preferably from about 0.025 to about 0.06, and most preferably from about 0.03 to about 0.05.

The particularly preferred M/C ratio in the catalyst-loaded coal compositions depends on the type or types of coal in the composition. For example, in embodiments where the coal is sub-bituminous, the preferred M/C ratio ranges from about 0.025 to about 0.06, most preferably from about 0.03 to about 0.05, while in embodiments where the coal is lignite, the preferred M/C ratio ranges from about 0.02 to about 0.05, most preferably from about 0.03 to about 0.04.

Catalyst-loaded coal compositions in accordance with the present invention that comprise catalyst in an amount that falls within a preferred M/C ratio are more active than previously known coal compositions in an integrated process for making methane from coal, and as such provide a more cost-effective steady-state integrated coal gasification process.

The catalyst-loaded coal compositions have a moisture content of less than about 6 wt %, preferably less than about 4 wt %. Moisture content in accordance with the present disclosure should be determined using a slight modification of the ASTM D3173-03 procedure, wherein the sample is dried for a time sufficient to achieve a constant weight, typically 24 hours at 107° C. under a stream of dry nitrogen. Use of this modified ASTM procedure to determine moisture content is useful due to the generally hygroscopic nature of the catalyst-loaded coal compositions since longer times are required to achieve constant weight.

The catalyst-loaded coal compositions can be prepared by a DCL process comprising: (a) grinding a coal, (b) soaking the ground coal in an excess amount of catalyst-containing solution at a contact time and temperature so as to provide ample opportunity to achieve substantial and uniform catalyst loading, (c) dewatering the soaked catalyst-loaded coal, and (d) drying the dewatered catalyst-loaded coal by thermal treatment under a dry inert gas flow. In a preferred embodiment, the catalyst loaded coal compositions are prepared by a DCL process comprising: (a) grinding a raw coal, (b) soaking said ground coal in an excess of aqueous solution comprising a salt of said catalyst to form a slurry wherein said slurry is at a slurry density within the range from about 10 wt % to about 25 wt % solids; (c) holding said slurry at a contact temperature and for a contact time so as to provide ample opportunity to achieve substantial and uniform catalyst loading; (d) dewatering said slurry to form a catalyst-loaded wet coal cake; and (e) thermally-treating said catalyst-loaded wet coal cake under a flow of inert dry gas at a temperature and for a time sufficient to reduce the moisture content to less than about 6 wt %.

The DCL process loads catalyst such that the catalyst is predominantly associated with the coal matrix, for example by ion-exchange with the acidic functional groups within the coal. The DCL process also loads catalyst by liquid-phase diffusion (i.e., surface wetting and pore flooding). It is believed that this DCL process, as opposed to the previously known methods such as IW method, maximizes the percentage of loaded catalyst that is associated with the coal matrix, e.g., as ion-exchanged catalyst.

In one embodiment, the coal is ground into a fine powder, which facilitates efficient catalyst loading. The ground coal has a particle size preferably ranging from about 25 microns to about 2500 microns, more preferably from about 45 microns to about 500 microns.

The coal can be ground by any methods known to the art, including, but not limited to, dry grinding and wet grinding. In a preferred embodiment, the coal is ground using a wet method, i.e., in the presence of water. Wet-ground coal can be separated from water (i.e., dewatered) by vibratory screening, or by filter press, to form a filter cake. The filter cake formed by the wet grinding in accordance with one embodiment of the present disclosure has a moisture content ranging from about 40% to about 60%, preferably from about 40% to about 55%, and most preferably below 50%. It will be appreciated by one of ordinary skill in the art that the moisture content of dewatered wet-ground coal depends on the particular type of coal, the particle size distribution, and the particular dewatering equipment used.

In various embodiments, the coal is separated into two fractions. The two fractions, fraction A and fraction B, can be in a ratio ranging from about 50:50 to about 90:10, with fraction A being the larger fraction. In a first preferred embodiment, the coal is wet-ground and dewatered prior to separating into fractions A and B, and the total amount of catalyst is loaded onto only fraction A by the soaking step. After catalyst loading, fraction A is dewatered and thoroughly mixed with fraction B, and the blend is fed to the thermal dryer to provide a catalyst-loaded coal composition. In a second preferred embodiment, the coal is separated into fractions A and B, wherein fraction A is wet ground, fraction B is dry ground, and the total amount of catalyst is loaded onto only fraction A by the soaking step. After catalyst loading, fraction A is dewatered and thoroughly mixed with fraction B, and the blend is fed to the thermal dryer to provide the catalyst-loaded coal compositions. It will be understood by one of ordinary skill in the art that the blend of the second preferred embodiment will contain the same amount of catalyst as the blend of the first preferred embodiment, but will contain less total water.

In accordance with the DCL process of the invention, finely ground coal is soaked as a slurry in an excess of a catalyst-rich influent solution of a salt of a catalyst. Preferable catalyst salts include, but are not limited to, carbonate, hydroxide, sulfate, chloride, and nitrate salts. In preferred embodiments, carbonate or hydroxide salts are used. In a particularly preferred embodiment, potassium carbonate is used. The total amount of catalyst loaded is controlled by controlling the concentration of catalyst in the influent solution, although it is also contemplated to control the total amount of catalyst loaded by controlling the concentration of catalyst in the raffinate solution. Furthermore, the concentration of catalyst in the influent solution is controlled to maximize the amount of ion-exchanged catalyst. The slurry is maintained at a suitable predetermined slurry density for sufficient contact time so that a diffusion-driven ion exchange loading of the catalyst is achieved to a desired level. In various embodiment, the concentration of catalyst in the influent solution ranges from about 0.3 mol/kg to about 3.0 mol/kg, preferably from about 0.5 mol/kg to about 2.2 mol/kg, and more preferably from about 0.7 mol/kg to about 1.7 mol/kg.

In preferred embodiments, the slurry density is maintained within the range from about 5 wt % to about 40 wt % solids, preferably from about 10 wt % to about 25 wt % solids, and most preferably from about 12 wt % to about 18 wt % solids. "Slurry density" is defined as the weight percent ratio of dry coal solids to the sum of dry coal solids and the total water in the system. The weight of added catalyst salt in solution has a minor effect on the specific gravity of solution and is thus ignored. "Total water" refers to the sum of the added water and the water contained in the ground coal. In preferred embodiments, the slurry is held for a contact time ranging from about 1 hour to about 48 hours, preferably from about 1 hour to about 8 hours, and most preferably from about 2 hours to about 3 hours. In preferred embodiments, the slurry is held at a contact temperature ranging from about 20° C. to about 95° C., preferably from about 30° C. to about 80° C., and most preferably from about 35° C. to about 50° C. In the DCL process, the contact time required to achieve equilibrium decreases with increasing contact temperature.

Following the soaking of the ground coal in an excess of catalyst-containing solution, the solids and liquids are separated (i.e., the solids are dewatered) to yield a catalyst-loaded wet coal cake (i.e., solid) and a catalyst-containing raffinate solution (i.e., liquid). In a preferred embodiment, the coal is separated by filtration. In a preferred embodiment, in an integrated process, the raffinate solution is recycled to the influent stream. The moisture content of the catalyst-loaded wet coal cake generally ranges from about 40 wt % to about 55 wt %. The concentration of catalyst contained in the moisture within the wet coal cake contains is the same as the concentration of catalyst in the raffinate solution.

The total amount of catalyst loaded onto the coal in accordance with the DCL process is controlled at this stage of the process. The amount of catalyst loaded by adsorption is determined by the adsorption isotherm, an inherent property of a given coal. The amount of catalyst loaded by adsorption is a function of the concentration of catalyst in the raffinate. The remainder of the catalyst loaded at this stage is dissolved in the moisture, and as such is a function of both the concentration of catalyst in the raffinate and the moisture content of the wet coal cake. Without being limited by mechanism, it is believed that adsorption of catalyst onto coal occurs by an ion-exchange mechanism.

In another embodiment, a small amount of organic wetting agent can be added to the solution to facilitate pore wetting and diffusion. In preferred embodiments, a wetting agent is used when the catalyst is sodium. Suitable wetting agents are those that do not contain elements such as phosphorous and boron which can build up as impurities in the recycled catalyst solutions and are thus detrimental to the gasification process. Suitable wetting agents include, but are not limited to, non-ionic surfactants (e.g., DOW Triton CF-10 and DOW Triton CF-21, alkyl polyglucosides), sulfate or sulfonate anionic surfactants (e.g., Triton QS-15), alkyldiphenyloxide disulfonate salts (e.g., DOW FAX-2A1), ethylene oxide/propylene oxide copolymers, and octylphenol ethoxylates (e.g., TRITON BG-10, TERGITOL L, OR TRITON X).

Following the steps of soaking and dewatering, the catalyst-containing wet coal cake is thermally-treated under a counter-current stream of dry inert gas to a moisture content of less than about 6 wt %, preferably less than about 4 wt %, to yield the catalyst-loaded coal compositions of the invention. In one embodiment, the wet coal cake is gradually heated and dried under an inert dry gas sweep in a thermal dryer (14, FIG. 1). In a preferred embodiment, the inert gas is nitrogen, argon, $CO/H_2$ fresh gas, $CO/H_2$ recycle gas, or mixtures thereof. In various embodiments, the thermal treatment is performed at temperatures ranging from about 90° C. to about 250° C., preferably from about 105° C. to about 250° C., more preferably from about 110° C. to about 230° C., even more preferably from about 145° C. to about 220° C., and most preferably from about 170° C. to from about 210° C. In other embodiments, the thermal drying may be performed using a temperature gradient within any of the preferred ranges. The most preferable temperature ranges for thermal treatment can depend on the rank of coal used. As a non-limiting example, the above preferable temperature ranges are most suitable for sub-bituminous coal, e.g., PRB coal. For lignite coal, lower temperatures can be preferable to avoid excessive decomposition. As a non-limiting example, lignite coal may be thermally treated at temperatures ranging from about 145° C. to about 175° C. The time required to achieve the desired moisture content will depend on a number of factors, including but not limited to the BTU rating of the thermal dryer. In a particularly preferred embodiment, the coal is thermally treated for a time sufficient for the solids to reach a preferred temperature.

In embodiments where the catalyst-containing soaking solution comprises a carbonate salt of a catalyst, it is believed that the thermal-treatment step decomposes any free metal bicarbonates to yield carbon dioxide and metal carbonate. Free metal bicarbonates may be present in the catalyst-loaded wet coal cake as a result of ion-exchange between the carbonate in the soaking solution and the acidic groups within the coal matrix. Without being limited by mechanism, it is believed that the generation and subsequent decomposition of alkali metal bicarbonates occur according to the following chemical equations, wherein M is the catalyst atom and R—COOH is a representative carboxylic acid functional group within the coal matrix:

$$R-COOH + M_2CO_3 \rightarrow R-COOM + MHCO_3$$

$$2MHCO_3 \rightarrow CO_2 + H_2O + M_2CO_3$$

The above chemical equation may be generalized to all acidic functional groups in the coal matrix (i.e., phenol, mercaptan, sulfonic acid). In these embodiments, the catalyst-loaded coal composition, after thermal treatment, can contain substantially no free bicarbonate, as determined by infrared spectroscopy.

It is believed that the thermal-treatment step functions to gradually adjust upwards the percentage of loaded catalyst that is present as ion-exchange catalyst. The percentage of catalyst present as ion-exchanged catalyst can be controlled by controlling the final temperature of the solids, the time of thermal treatment, and the flow-rate of the inert gas (19, FIG. 1). As the moisture content of the filter cake decreases, the concentration of catalyst in the moisture contained in the filter cake (i.e., the raffinate) increases. As a result, the equilibrium amount of ion-exchanged catalyst loaded on the coal shifts to higher values, in accordance with the adsorption isotherm. Furthermore, higher temperature generally increases the equilibrium ion-exchange loading capacity of the coal. In a preferred embodiment, the thermal treatment process progresses from a temperature of about 90° C. to a temperature of up to about 250° C.

The catalyst-loaded coal compositions are particularly useful for efficient gasification to methane, and more particularly for use in a steady-state integrated gasification process that can maximize carbon conversion while minimizing the total amount of catalyst used. In one embodiment, the catalyst-loaded coal compositions are gasified in the presence of heated steam to produce methane, along with CO, $CO_2$, and $H_2$. In preferred embodiments, the gasification process is performed at a temperature ranging from about 450° C. to about 700° C., preferably from about 600° C. to about 700° C. In preferred embodiments, the gasifier is operated at a pressure ranging from about 50 psig to about 1000 psig, preferably from about 200 psig to about 700 psig, and more preferably from about 400 psig to about 600 psig.

Figure 2:
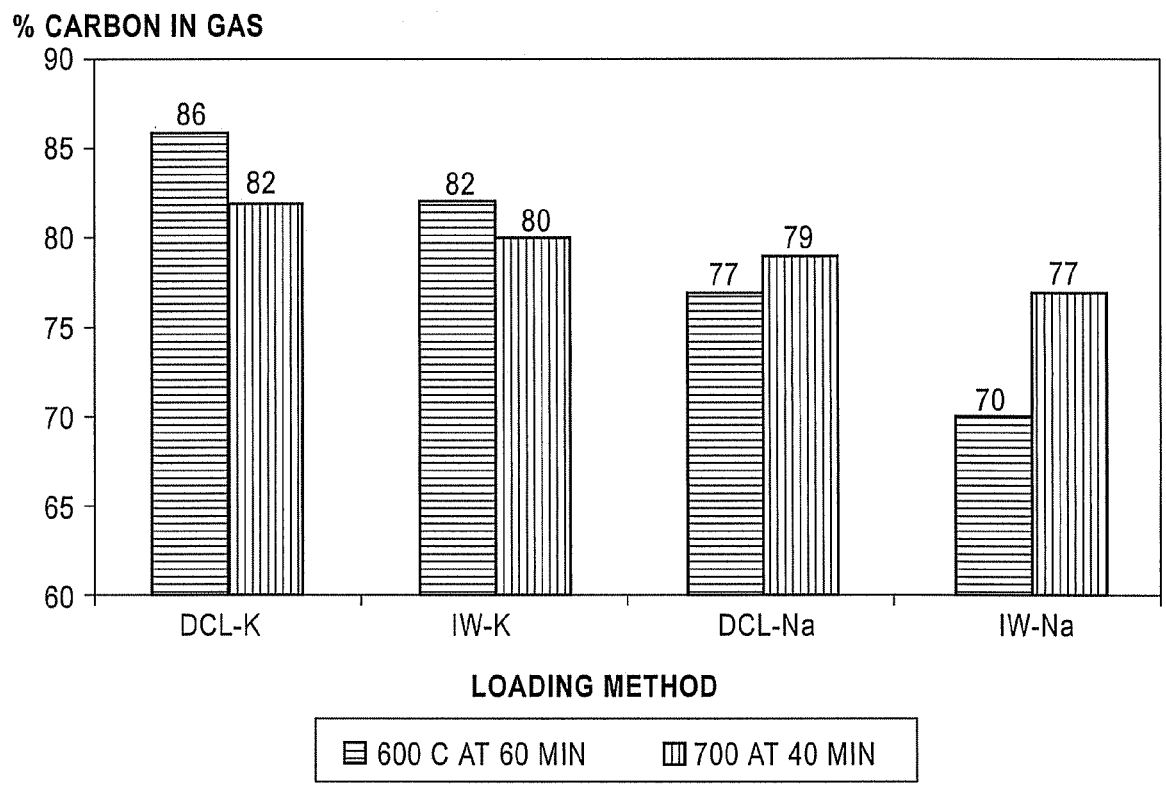
FIG. 2 shows relative gasification efficiency by comparing the pressure of gas produced from catalyst-loaded coal compositions with the same ratio of catalyst atoms to carbon atoms, prepared by the DCL process in accordance with the invention and by the conventional IW method.
Figure 3:
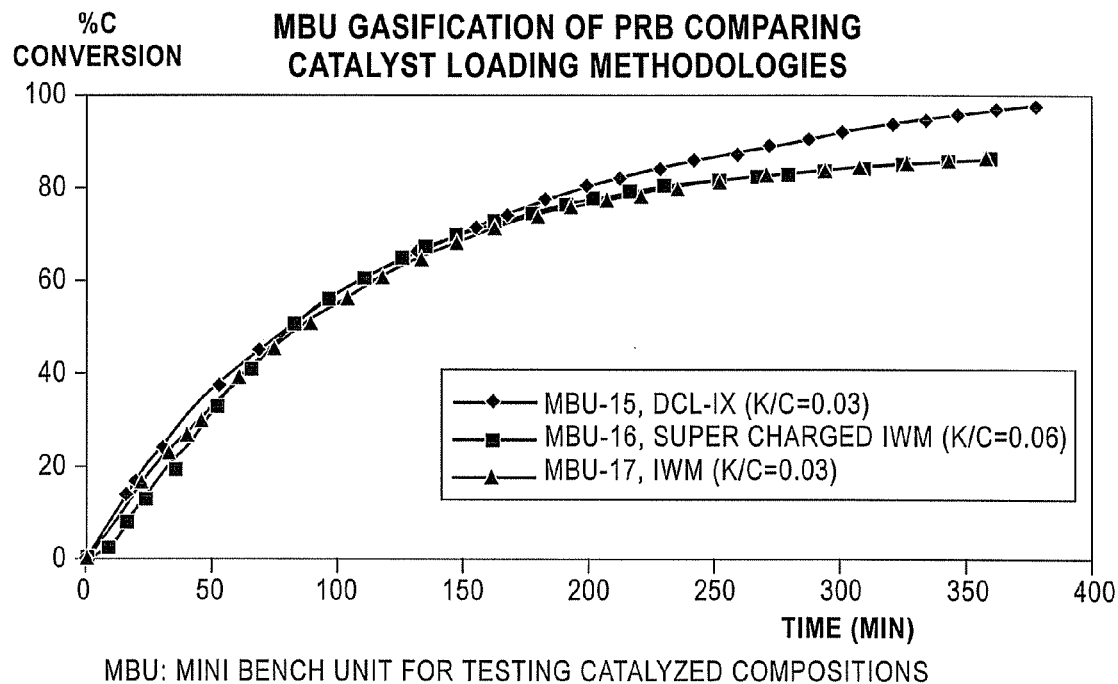
FIG. 3 shows relative gasification efficiency by comparing the percent carbon conversion of catalyst-loaded coal compositions with the same ratio of catalyst atoms to carbon atoms, prepared by the DCL process in accordance with the present invention and by the conventional IW method.

FIGS. 2 and 3 compare the gasification performance of catalyst-loaded coal compositions with that of coal compositions previously known prepared by the IW method. FIGS. 2 and 3 demonstrate that the catalyst-loaded coal compositions of the invention are more efficiently gasified and result in higher % carbon conversion than catalyst-loaded coal compositions prepared by the IW method. The data of FIG. 3 are tabulated in Table 1. Without being bound by any theory or mechanism, it is believed that the catalyst-loaded coal compositions of the present invention perform better than previously known coal compositions because the majority of the catalyst is highly dispersed throughout and associated with the coal matrix on the acidic functional groups.

TABLE 1

Gasification of Catalyst-Loaded PRB Coal

| DCL (K/C = 0.03) | | IW (K/C = 0.06) | | IW (K/C = 0.03) | |
|---|---|---|---|---|---|
| Time (s) | % C Conversion | Time (s) | % C Conversion | Time (s) | % C Conversion |
| 16 | 13.7 | 8 | 2.8 | 21 | 16.9 |
| 19 | 16.7 | 15 | 8.4 | 31 | 23.5 |
| 29 | 24.6 | 23 | 14.4 | 38 | 27.5 |
| 52 | 37.8 | 33 | 21.4 | 44 | 30.8 |
| 62 | 42.1 | 52 | 33.4 | 60 | 39.4 |
| 69 | 44.8 | 65 | 40.9 | 74 | 45.9 |
| 79 | 48.8 | 74 | 45.2 | 88 | 51.2 |
| 95 | 55.0 | 83 | 50.3 | 104 | 56.7 |
| 108 | 59.6 | 97 | 55.6 | 118 | 60.9 |
| 125 | 64.3 | 111 | 60.3 | 133 | 64.7 |
| 137 | 67.7 | 126 | 64.4 | 147 | 67.9 |
| 154 | 71.5 | 136 | 66.9 | 163 | 71.4 |
| 167 | 74.1 | 148 | 69.3 | 179 | 74.1 |
| 183 | 77.1 | 163 | 72.1 | 193 | 75.7 |
| 200 | 79.7 | 178 | 74.2 | 207 | 77.4 |
| 213 | 81.6 | 191 | 75.7 | 220 | 78.7 |
| 229 | 83.8 | 203 | 77.2 | 236 | 80.2 |
| 243 | 85.5 | 217 | 78.6 | 252 | 81.7 |
| 259 | 87.3 | 231 | 79.7 | 271 | 82.8 |
| 273 | 88.7 | 252 | 81.2 | 294 | 83.8 |
| 289 | 90.4 | 268 | 82.1 | 308 | 84.7 |
| 303 | 91.6 | 281 | 82.8 | 327 | 85.3 |
| 322 | 93.3 | 295 | 83.4 | 343 | 85.9 |
| 335 | 94.4 | 311 | 84.1 | 357 | 86.4 |
| 349 | 95.2 | 326 | 84.4 | | |
| 362 | 96.3 | 343 | 85.1 | | |
| 379 | 97.3 | 361 | 85.6 | | |

The DCL process of the present invention can be used to load any target amount of catalyst onto a coal. In preferred embodiments, the amount of catalyst loaded onto the coal is an amount sufficient to give a preferred M/C ratio. The preferred M/C ratio for the catalyst-loaded coal compositions of the invention ranges from about 0.01 to about 0.1, preferably from about 0.025 to about 0.06, and most preferably from about 0.03 to about 0.05. The amount of catalyst loaded onto the coal is controlled by controlling the amount of catalyst in the catalyst-containing soaking solution. In one embodiment of an integrated DCL process (FIG. 1), the catalyst-containing solution is an influent stream (9) and is comprised of a raffinate stream (the effluent from the DCL process (12), a recycle stream (containing the catalyst extracted from the char after gasification (21), and a makeup stream (containing fresh catalyst (24)), evaporated to a desired concentration in an evaporated (25). In the integrated gasification process, the amount of catalyst in influent stream (9) is controlled by monitoring the amount of catalyst in the raffinate stream (12), monitoring the amount of catalyst in the recycle stream (21), and adjusting the amount of catalyst in the makeup stream (24).

In accordance with the present invention, it has been found that a higher catalyst loading does not necessarily correlate with a higher percent carbon conversion. The catalyst-loaded coal compositions of the present invention, prepared by the DCL process of the present invention, require less catalyst and achieve the same or higher % carbon conversion than the prior art coal compositions. Tables 2 and 3 tabulate the range of % carbon conversions achievable in an optimally operated steady-state integrated gasification process using a catalyst-loaded coal composition with various M/C ratios, wherein the catalyst was potassium cation, and wherein the coal was sub-bituminous PRB coal and lignite coal, respectively.

TABLE 2

Sub-Bituminous PRB

| M/C Atom Ratio | Carbon Conversion Range | |
|---|---|---|
| | % | % |
| 0.020 | 92.2 | 93.8 |
| 0.030 | 90.5 | 92.3 |
| 0.036 | 89.4 | 91.5 |
| 0.040 | 88.7 | 90.9 |

TABLE 3

Lignite

| M/C Atom Ratio | Carbon Conversion Range | |
|---|---|---|
| | % | % |
| 0.0360 | 84.9 | 87.9 |
| 0.0500 | 82.3 | 85.9 |
| 0.0600 | 80.5 | 84.4 |

In accordance with the invention, and the specific examples of Tables 2 and 3, the preferable M/C ratio for the catalyst-loaded coal compositions suitable for use in an efficient integrated gasification process ranges from about 0.01 to about 0.1, preferably from about 0.025 to about 0.06, and most preferably from about 0.03 to about 0.05. It will be understood to one of ordinary skill in the art that the preferred ranges can vary with the use of different types of coal and different catalysts. As a non-limiting example, a preferable M/C ratio for sub-bituminous PRB coal and potassium catalyst is 0.034 while a preferable M/C ratio for lignite coal and potassium catalyst is 0.036.

Figure 4:
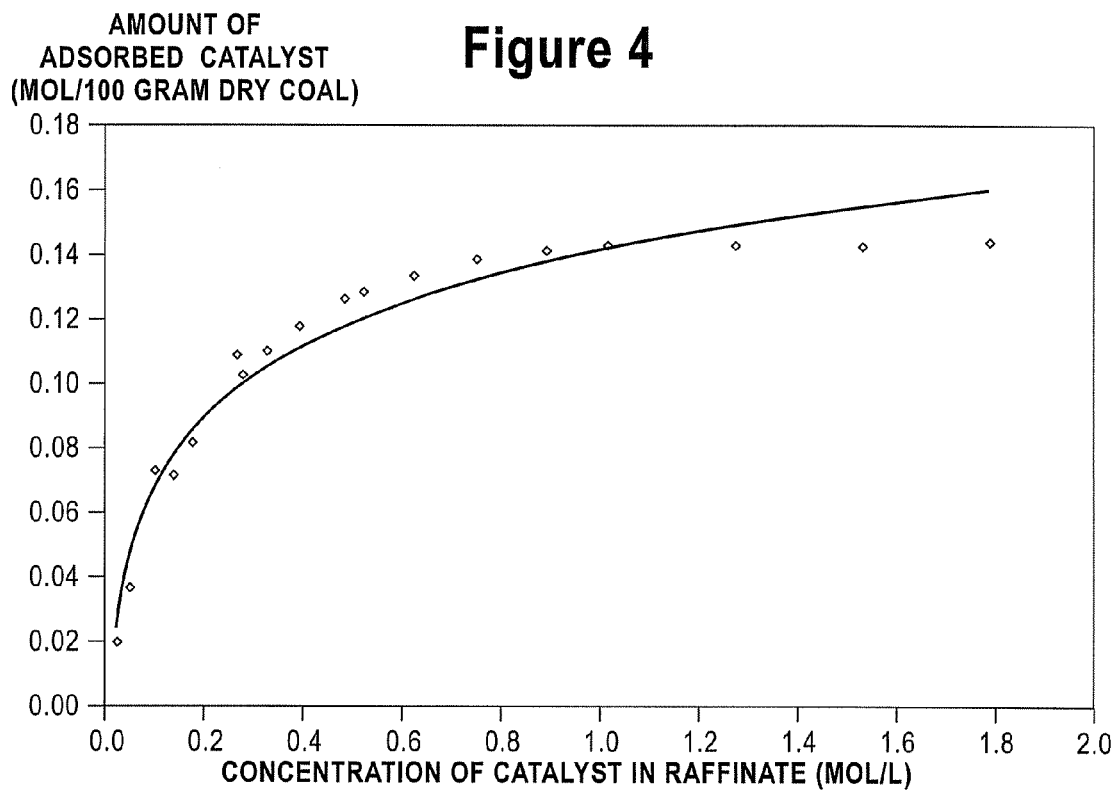
FIG. 4 shows the adsorption isotherm of a sub-bituminous Powder River Basin (PRB) coal with a potassium catalyst.

In accordance with the DCL process, the loaded catalyst is predominantly associated with the coal matrix, such as by ion-exchange. Highly dispersed loading of catalyst onto coal is believed facilitated by ion-exchange with acidic functional groups on coal, including but not limited to carboxylic acid, sulfonic acid, phenol and mercaptan functional groups. A higher degree of ion-exchange is believed further facilitated by the increased wetability afforded by the diffusive process. The amount of catalyst that is loaded onto the coal by ion-exchange is governed by the adsorption isotherm for a given coal sample. The adsorption isotherm correlates the amount of catalyst adsorbed by the coal with the concentration of catalyst in the catalyst-containing solution at equilibrium. Adsorption isotherms are experimentally determined by measuring the equilibrium amount of catalyst loaded by ion-exchange as a function of the concentration of catalyst in the loading solution at a given temperature (Example 2). FIG. 4 shows a representative experimentally determined adsorption isotherm plot for sub-bituminous PRB coal with a potassium catalyst at room temperature, and a mathematical fit to the experimental data. The adsorption isotherm of FIG. 4 indicates that the coal has a saturation adsorption catalyst loading capacity (believed to be adsorbed by ion-exchange) at room temperature of approximately 0.14 moles of potassium per 100 grams of dry coal (corresponding to about 5.5 grams potassium per 100 grams dry coal) and an equilibrium concentration of approximately 0.9 moles potassium per liter (corresponding to about 35.2 grams potassium per liter) in the raffinate solution. The data are generated at DCL loading conditions by using slurries containing ground coal and excess aqueous solutions of varying concentrations of catalyst. In one embodiment, slurries are mixed for approximately 24-48 hours, or until the concentration of catalyst in the loading solution becomes constant, to ensure complete equilibration. At equilibrium, the amount of catalyst loaded can be inferred by measuring the decrease in the amount of catalyst in the aqueous solution. Adsorption isotherms, and thus equilibrium ion-exchange catalyst loading capacity, are temperature-dependent. In general, though not exclusively, the ion-exchange catalyst loading capacity of coal increases with increasing temperature.

In addition to catalyst taken up by ion-exchange in accordance with the adsorption isotherm for a given sample, the coal also take up catalyst as raffinate by surface wetting and pore flooding. That is, an amount of the catalyst-containing soaking solution (i.e., raffinate) remains in the coal after the soaking and dewatering steps of the DCL process. The concentration of catalyst in the soaking solution upon completion of the adsorption equilibrium and the amount of the solution taken up by the coal (i.e., moisture content) determine the amount of "free" catalyst in the coal. As described above, upon thermal-treatment, the moisture content is reduced to less than about 6 wt %, preferably less than about 4 wt %, and the catalyst dissolved in the raffinate within the coal thus becomes "free" catalyst. In order to achieve a coal with a particular target catalyst loading, and preferably a coal with a preferred M/C ratio in accordance with the present invention, the concentration of catalyst remaining in the raffinate solution after loading must be considered and controlled. In embodiments where the desired total catalyst loading is greater than that saturation ion-exchange loading according to the adsorption isotherm, the required raffinate concentration, $C_k$, can be determined using the following equation:

$$C_k \times W_s = M_k - L$$

wherein "$W_s$" represents the moisture content of the dewatered catalyst loaded coal cake, "$M_k$" represents the desired total catalyst loading, and "L" represents the saturation ion-exchange loading. Alternatively, in embodiments where the desired total catalyst loading approximates the saturation ion-exchange loading, one can simultaneously solve the following mathematical equations to determine the required catalyst concentration in the raffinate:

$$M_x = f(C_k) \text{ or } M_x = f(M_{rs}/W_s)$$

$$M_x + M_{rs} = M_k,$$

Wherein f is the mathematical fit to the experimental adsorption isotherm data, "$M_x$" represents ion-exchanged catalyst, and "$M_{rs}$" represents the quantity of catalyst in wet cake in excess of the ion-exchanged catalyst. The water-content of the dewatered catalyst-loaded wet coal cake, "$W_s$", should be determined by using the modified ASTM moisture-content procedure described herein.

In one embodiment of the integrated gasification process, catalyst is recovered from the char (20) in a recovery unit (22) and recycled as a recycle stream (21) into the loading process. The amount of catalyst in the influent stream (i.e., catalyst-containing soaking solution (9)) is controlled by monitoring and controlling the concentration of catalyst in the effluent stream (i.e, the raffinate stream (12)), the recycle stream (21), and the makeup stream (24). In particularly preferred embodiments, the effluent stream is used in the catalyst recovery process for catalyst make up and concentration adjustment. In one embodiment of an integrated gasification process of the present disclosure, char is removed from the gasifier bed at regular intervals, catalyst is extracted from the char in soluble form, and the extracted catalyst is recycled to the influent catalyst-containing solution.

In a particular embodiment of the integrated gasification process, sub-bituminous PRB coal is wet ground to generate a dewatered ground wet filter cake. The wet filter cake is fed to the catalyst loading operation and contacted with an influent catalyst-rich solution containing potassium carbonate and water. A portion of the influent solution is comprised of recycled catalyst. The slurry is held at a contact temperature of about 40° C. for a contact time of about 2 hr. The catalyst slurry is dewatered using vibratory screens or a filter press. The catalyst-loaded wet coal cake is fed continuously to a thermal-drying unit, designed such that the solids reach a temperature of between 140° C. and 210° C. The dried catalyst-loaded coal composition is fed continuously into the gasifier reactor. The gasifier is operated at a temperature of approximately 700° C. and a pressure of approximately 500 psig. Reactant superheated steam and recycled gases, mostly CO and $H_2$, are introduced at the lower part of the reactor by means of a gas distributor. The gasification reaction produces a gas product containing $CH_4$, $CO_2$, $H_2$, CO and $H_2O$, with small amounts of $H_2S$ and $NH_3$. The bed residence time and/or the bed volume are adjusted to the feed rate and carbon conversion rates so that a particular bed composition is maintained. The bed composition is the same as the composition of the char solids withdrawn from the reactor to maintain material balance. The char removed from the process is sent to a catalyst recovery section. The recovered catalyst solution is sent to the catalyst loading section as a catalyst recycle stream and used in the catalyst loading step.

Specific Embodiments

Specific embodiments of the present invention include, but are not limited to, the following.

One embodiment of the invention is a catalyst-loaded coal composition that comprises a coal and a gasification catalyst, the composition having a moisture content of less than about 6 wt %, or less than about 4 wt %. The particle size of the coal can range from about 25 microns to about 2500 microns. The gasification catalyst can be an alkali metal cation or mixtures thereof, such as a potassium cation, a sodium cation, a lithium cation or mixtures thereof. The coal can be a sub-bituminous, bituminous, lignite, anthracite or mixtures thereof. The gasification catalyst can be present in an amount such that a ratio of catalyst atoms to carbon atoms is in the range of about 0.01 to about 0.1, or from about 0.025 to about 0.06, or from about 0.03 to about 0.05. Greater than about 50% of the total amount of catalyst loaded may be associated with the coal matrix on the acidic functional groups of the coal, with the association being by ion-exchange.

A more specific embodiment is where the coal is sub-bituminous, the gasification catalyst is potassium cation, and the gasification catalyst is present in an amount such that a ratio of catalyst atoms to carbon atoms is in the range of about 0.03 to about 0.05. Another more specific embodiment is where the coal is lignite, the gasification catalyst is potassium cation, and the gasification catalyst is present in an amount such that a ratio of catalyst atoms to carbon atoms is in the range of about 0.03 to about 0.04.

Another embodiment of the invention is a method of preparing a catalyst-loaded coal composition comprising the steps of (a) grinding a raw coal; (b) soaking the ground coal in an excess of aqueous solution comprising a salt of a catalyst to form a slurry wherein said slurry is at a density within the range from about 10 wt % to about 25 wt % solids; (c) holding the slurry at a contact temperature and for a contact time so as to provide ample opportunity to achieve substantial and uniform catalyst loading; (d) dewatering the slurry to form a catalyst-loaded wet coal cake; and (e) thermally-treating the catalyst-loaded wet coal cake under a flow of inert dry gas at a temperature and for a time sufficient to reduce the moisture content to less than about 6 wt %, or less than about 4 wt %.

Another embodiment of the invention is a catalyst-loaded coal composition having a moisture content of less than about 6 wt %, prepared by a process comprising the steps of (a) grinding a raw coal; (b) mixing the ground coal with an aqueous solution comprising a salt of a catalyst to form a slurry, wherein the slurry is at a density within the range from about 10 wt % to about 25 wt % solids; (c) holding the slurry at a contact temperature and for a contact time so as to provide ample opportunity to achieve substantial and uniform catalyst loading; (d) dewatering the slurry by filtration to form a catalyst-loaded wet coal cake; and (e) thermally-treating the catalyst-loaded wet coal cake under a flow of inert dry gas.

The catalyst can be potassium, sodium, lithium or mixtures thereof. The solution can further comprise a phosphorous- and boron-free wetting agent. The coal can be a sub-bituminous, bituminous, lignite, anthracite or mixtures thereof. The dewatered filter cake can have a moisture content ranging from about 40% to about 60%. The slurry can be held at a contact temperature ranging from about 20° C. to about 95° C., or from about 30° C. to about 80° C., or from about 35° C. to about 50° C., for a contact time ranging from about 1 hours to about 48 hours, or from about 1 hours to about 8 hours, or from about 2 hours to about 3 hours. The thermally-treating step can be performed at a temperature ranging from about 90° C. to about 250° C., or from about 110° C. to about 230° C., or from about 170° C. to about 210° C. The inert dry gas can comprise nitrogen, argon, carbon dioxide, fresh $CO/H_2$, recycled $CO/H_2$, or mixtures thereof. The aqueous solution can comprise an amount of said catalyst salt sufficient to provide said catalyst-loaded coal composition having a ratio of catalyst atoms to carbon atoms in the range of about 0.01 to about 0.1, or about 0.025 to about 0.06, or about 0.03 to about 0.05.

In one alternative, the ground coal prior to step (b) can be separated into a first fraction and a second fraction, wherein said first fraction is larger than said second fraction, and wherein said first and second fractions are in a ratio ranging from greater than 50:50 to 90:10, and wherein said first fraction is used in steps (b)-(d), and said second fraction is thoroughly mixed with said first fraction after steps (b)-(d) before step (e).

In another alternative, the coal prior to step (a) is separated into a first fraction and a second fraction, wherein said first fraction is larger than said second fraction, and wherein said first and second fractions are in a ratio ranging from greater than 50:50 to 90:10, and wherein said first fraction is used in steps (a)-(d), and said second fraction is ground, and said ground second fraction is thoroughly mixed with said first fraction after steps (a)-(d) before step (e).

A more specific embodiment is where the raw coal is sub-bituminous, the catalyst is potassium cation, the salt of the catalyst is potassium carbonate, and the aqueous solution comprises an amount of the catalyst salt sufficient to provide a catalyst-loaded coal composition having a ratio of catalyst atoms to carbon atoms in the range of about 0.03 to about 0.05.

In another more specific embodiment, the resulting catalyst-loaded coal composition is as set forth above.

Yet another embodiment of the invention is an integrated process for the steady-state gasification of an optimized reactor feed catalyst-loaded coal composition, comprising the steps of (a) providing a ground raw coal solid stream into a DCL contactor; (b) introducing an influent stream comprising a salt of a catalyst into the DCL contactor to create a slurry, wherein the influent stream is comprised of a raffinate stream, a recycle stream and a makeup stream; (c) controlling the amount of catalyst in the influent stream; (d) holding the slurry at a contact temperature and for a contact time so as to provide ample opportunity to achieve substantial and uniform catalyst loading; (e) dewatering the slurry by filtration to form a catalyst-loaded wet coal cake and the raffinate solution; (f) recycling the raffinate solution into the influent stream; (g) thermally-treating the catalyst-loaded wet coal cake under a flow of inert dry gas to reduce the moisture content to less than about 6 wt %; (h) gasifying the catalyst-loaded thermally-treated coal composition in a fluidized bed reactor in the presence of steam and recycled gas at a temperature ranging from about 450° C. to about 750° C. and a pressure ranging from about 50 psig and about 1000 psig; (i) withdrawing a raw gas stream comprising methane; (j) withdrawing char from the fluidized bed reactor; (k) extracting catalyst from the char; and (l) recycling extracted catalyst into the influent stream as the recycle stream.

The amount of catalyst in the influent stream can be controlled by a method comprising the steps of (a) monitoring the amount of catalyst in the raffinate stream; (b) monitoring the amount of catalyst in the recycle stream; and (c) adjusting the amount of catalyst in said makeup stream.

In a more specific embodiment, the concentration of catalyst in the influent stream is sufficient to provide the catalyst-loaded coal composition having a ratio of catalyst atoms to carbon atoms in the range of from about 0.01 to about 0.1, or from about 0.025 to about 0.06, or from about 0.03 to about 0.05.

In another more specific embodiment, the amount of catalyst in the influent stream ranges from about 0.3 mol/kg to about 3.0 mol/kg, or from about 0.5 mol/kg to about 2.2 mol/kg, or from about 0.7 mol/kg to about 1.7 mol/kg.

In the above integrated process, the gasifying step can be performed at a temperature ranging from about 450° C. to about 750° C., or from about 600° C. to about 700° C.; and/or at a pressure ranging from about 200 psig to about 700 psig, or from about 400 psig to about 600 psig.

In another specific embodiment of the integrated process, the ground raw coal is sub-bituminous, the catalyst is potassium cation, the salt of the catalyst is potassium carbonate, and the influent solution comprises a concentration of the catalyst salt sufficient to provide the catalyst-loaded coal composition having a ratio of catalyst atoms to carbon atoms in the range of about 0.03 to about 0.05.

EXAMPLES

The following non-limiting examples highlight various aspects and embodiments of the present invention. The full scope and content of the present invention will be understood to one of ordinary skill in the art based on the foregoing discussion and the following examples.

Example 1

Preparation of a Catalyst-Loaded Coal Composition

For a particular sample of sub-bituminous Powder River Basin (PRB) coal loaded with potassium catalyst by means of a potassium carbonate soaking solution, the target M/C ratio was chosen to be 0.036. The carbon content of the PRB coal was determined to be 69.55%, and thus the required amount of catalyst to be loaded on the coal is calculated to be 8.92 g of potassium per 100 g of dry coal. The ion-exchange loading capacity at room temperature for the PRB coal was determined by the experimental determination of the absorption isotherm (FIG. 4, Example 2), and was found to be about 5.5 g of potassium per 100 g of dry coal. Thus, the amount of free catalyst will be 8.92 g−5.5 g=3.42 g of potassium per 100 g of dry coal. The water content of the wet coal cake after soaking and dewatering was determined to be about 46 wt % (i.e., about 95 g water per 100 g dry coal). Thus, in order to achieve the desired target catalyst loading, the raffinate should have a potassium concentration of 36 g per liter. To achieve the target catalyst loading target amount, a solution of potassium carbonate was prepared by dissolving 37.25 grams of potassium carbonate in 312 grams of water. Finely ground coal was added to an Erlenmeyer flask, and the potassium carbonate soaking solution was added to the flask forming a slurry. The slurry density was maintained at approximately 20 wt % in the flask. The air inside the flask was displaced with nitrogen, and the flask was sealed with a stopper. The flask was then placed on a shaker bath and stirred for 4 hours at room temperature. The coal was then dewatered by filtering over a vibratory screen with a mesh size of about +325 yielding a well-filtered and drained catalyst-loaded wet coal cake. The wet coal cake was then thermally-treated (i.e., dried) to a constant weight under a stream of dry nitrogen flow while heating on a slow ramp to a temperature of about 180° C. The composition was found to have a moisture content of less than about 4 wt %. The dried catalyst-loaded coal composition was allowed to cool to room temperature under dry nitrogen flow. The final catalyst-loaded coal composition was stored at ambient temperature under dry and inert atmosphere.

Example 2

Experimental Determination an Adsorption Isotherm

Six samples of sub-bituminous PRB coal, each containing 75 grams dry-weight of wet-ground coal, were added to individual Erlenmeyer flasks. A set of six potassium carbonate solutions were prepared by dissolving 4 grams, 7.7 grams, 15.5 grams, 23 grams, 30.9 grams, 70 grams of $K_2CO_3$ in 400 ml of distilled water. 350 ml of each of the six solutions were added to the samples of wet-ground coal forming slurry mixtures. The initial concentration of potassium in each of the slurry mixtures was determined using the total volume of water in the slurry, which includes both the water contained in the wet-ground coal and the water added and the potassium carbonate solution. In this example the wet-ground coal contained approximately 53.3 wt % water, which corresponds with approximately 65.7 grams of water. The slurry mixtures were purged and sealed under a blanket of inert nitrogen gas, and allowed to equilibrate overnight at room temperature with mild agitation in a shaker bath. The slurry mixtures were then filtered over a vibratory screen with a mesh size of +325. The resultant concentration of potassium carbonate in the filtrate was then determined by XRD. The difference in potassium carbonate concentrations is equivalent to the amount of potassium adsorbed onto ion-exchange sites in the coal. The results of these experiments and calculations are plotted against starting concentration to yield the adsorption isotherm. Table 4 lists the above six data points, as well as a series of additional data points, determined analogously. FIG. 4 is a plot of the data listed in Table 4. FIG. 4 provides an estimate of the ion-exchange saturation loading of potassium in sub-bituminous PRB coal, and the corresponding equilibrium concentration of potassium in the resultant raffinate solution. FIG. 4 shows that the ion-exchange saturation loading potassium catalyst loading capacity is about 5.5 grams potassium per 100 grams dry PRB coal. FIG. 4 also illustrates the mathematical fit to the experimental data, fitted to the logarithmic function Y=C+b*ln(X). The empirical parameters were determined to be C=0.14056, b=0.03164, and the $R^2$=0.95643.

TABLE 4

| K in Solution (K mol/liter) | K on Solids (K mol/100 g coal) |
|---|---|
| 0.0256 | 0.0205 |
| 0.0532 | 0.037 |
| 0.1049 | 0.0731 |
| 0.1407 | 0.0716 |
| 0.179 | 0.0818 |
| 0.2685 | 0.109 |
| 0.2813 | 0.1023 |
| 0.3325 | 0.11 |
| 0.3964 | 0.1176 |
| 0.4859 | 0.126 |
| 0.5243 | 0.1279 |
| 0.6266 | 0.133 |
| 0.7545 | 0.1381 |
| 0.8951 | 0.1407 |
| 1.023 | 0.1419 |
| 1.2788 | 0.1419 |
| 1.5345 | 0.1419 |
| 1.7903 | 0.1432 |

Example 3

Determination of Bicarbonate Content of Catalyst-Loaded Coal

The catalyst-loaded coal composition of Example 1 was analyzed by FT-IR spectroscopy. The FTIR spectra were acquired in attenuated total reflectance (ATR) mode on a Thermo Nicolet 380 FTIR spectrometer using a Smart Orbit ATR accessory. The samples were ground to a powder and placed on the ATR's diamond crystal, and pressed against the crystal by an anvil. A total of 32 scans were accumulated, with a 4 cm$^{-1}$ resolution. The coal spectrum was not baseline corrected. The FT-IR spectrum of the catalyst-loaded coal composition show no peaks centered around 1000 cm$^{-1}$, 1300 cm$^{-1}$ and 2620 cm$^{-1}$ attributable to bicarbonate.

What is claimed:

1. An integrated process for the steady-state gasification of an optimized reactor feed catalyst-loaded coal composition, comprising the steps of:
   (a) providing a ground raw coal solid stream into a diffuse catalyst loading contactor, wherein the coal comprises a matrix containing ion exchange sites comprising acidic functional groups;
   (b) introducing an influent stream comprising a salt of a Group I alkali metal catalyst into the diffuse catalyst loading contactor to create a slurry, wherein the influent stream is comprised of a raffinate stream, a recycle stream and a makeup stream;
   (c) controlling the amount of catalyst in the influent stream such that the amount of Group I alkali metal catalyst in the influent stream is equal to or greater than the amount to achieve saturation ion-exchange loading of the coal;
   (d) holding the slurry at a contact temperature and for a contact time so as to provide ample opportunity to achieve substantial and uniform catalyst loading such that the Group I alkali metal catalyst is highly dispersed throughout the coal matrix;
   (e) dewatering the slurry by filtration to form a catalyst-loaded wet coal cake and the raffinate solution;
   (f) recycling the raffinate solution into the influent stream;
   (g) thermally-treating the catalyst-loaded wet coal cake under a flow of inert dry gas to reduce the moisture content to less than about 6 wt %, such that greater than about 50% of the total amount of the catalyst loaded is Group I alkali metal catalyst associated with the coal matrix;
   (h) gasifying the catalyst-loaded thermally-treated coal composition in a fluidized bed reactor in the presence of steam, CO and $H_2$ at a temperature ranging from about 450° C. to about 750° C. and a pressure ranging from about 50 psig and about 1000 psig, to produce a char and a raw gas stream comprising methane;
   (i) withdrawing the raw gas stream from the fluidized bed reactor;
   (j) withdrawing the char from the fluidized bed reactor;
   (k) extracting catalyst from the char; and
   (l) recycling extracted catalyst into the influent stream as the recycle stream.

2. The integrated process according to claim 1, wherein the amount of Group I alkali metal catalyst in the influent stream is controlled by a method comprising the steps of:
   (a) monitoring the amount of Group I alkali metal catalyst in the raffinate stream;
   (b) monitoring the amount of Group I alkali metal catalyst in the recycle stream; and
   (c) adjusting the amount of Group I alkali metal catalyst in the makeup stream.

3. The integrated process according to claim 1, wherein the concentration of Group I alkali metal catalyst in the influent stream is sufficient to provide the catalyst-loaded coal composition having a ratio of Group I alkali metal catalyst atoms to carbon atoms in the range of about 0.01 to about 0.1.

4. The integrated process according to claim 1, wherein the amount of Group I alkali metal catalyst in the influent stream ranges from about 0.3 mol/kg to about 3.0 mol/kg.

5. The integrated process according to claim 1, wherein the coal is sub-bituminous, bituminous, lignite, anthracite or mixtures thereof.

6. The integrated process according to claim 1, wherein the ground raw coal is sub-bituminous, the catalyst is potassium cation, the salt of said catalyst is potassium carbonate, and the influent solution comprises a concentration of the catalyst salt sufficient to provide the catalyst-loaded coal composition having a ratio of catalyst atoms to carbon atoms in the range of about 0.03 to about 0.05.

7. The integrated process according to claim 1, wherein greater than about 70% of the total amount of catalyst loaded is Group I alkali metal catalyst associated with the coal matrix.

8. The integrated process according to claim 1, wherein greater than about 50% of the total amount of the catalyst loaded is Group I alkali metal catalyst associated with the coal matrix by ion exchange on the acidic functional groups of the coal.

9. The integrated process according to claim 1, wherein greater than about 70% of the total amount of the catalyst loaded is Group I alkali metal catalyst associated with the coal matrix by ion exchange on the acidic functional groups of the coal.

10. The integrated process according to claim 1, wherein the slurry is held at a contact temperature ranging from about 20° C. to about 95° C. for a contact time ranging from about 1 hours to about 48 hours.

11. The integrated process according to claim 1, wherein the thermally-treating step is performed at a temperature ranging from about 90° C. to about 250° C.

12. The integrated process of claim 1, wherein the Group I alkali metal is potassium.

13. The integrated process of claim 2, wherein the Group I alkali metal is potassium.

14. The integrated process of claim 3, wherein the Group I alkali metal is potassium.

15. The integrated process of claim 4, wherein the Group I alkali metal is potassium.

16. The integrated process of claim 7, wherein the Group I alkali metal is potassium.

17. The integrated process of claim 8, wherein the Group I alkali metal is potassium.

18. The integrated process of claim 9, wherein the Group I alkali metal is potassium.

19. The integrated process of claim 10, wherein the Group I alkali metal is potassium.

20. The integrated process of claim 11, wherein the Group I alkali metal is potassium.

* * * * *